US011950527B2

(12) United States Patent
Coleman

(10) Patent No.: US 11,950,527 B2
(45) Date of Patent: Apr. 9, 2024

(54) DEVICE AND METHOD FOR CALIBRATING OUTDOOR POWER EQUIPMENT AND QUALITY OF CUT

(71) Applicant: MTD Products Inc, Valley City, OH (US)

(72) Inventor: John Coleman, Sheffield (GB)

(73) Assignee: MTD PRODUCTS INC, Valley City, OH (US)

( * ) Notice: Subject to any disclaimer, the term of this patent is extended or adjusted under 35 U.S.C. 154(b) by 390 days.

(21) Appl. No.: 16/885,408

(22) Filed: May 28, 2020

(65) Prior Publication Data

US 2020/0375097 A1    Dec. 3, 2020

Related U.S. Application Data

(60) Provisional application No. 62/853,318, filed on May 28, 2019.

(51) Int. Cl.
*A01D 34/00* (2006.01)
*A01D 34/68* (2006.01)
*A01D 101/00* (2006.01)

(52) U.S. Cl.
CPC ....... *A01D 34/008* (2013.01); *A01D 34/6806* (2013.01); *A01D 2101/00* (2013.01); *G05D 2201/0208* (2013.01)

(58) Field of Classification Search
None
See application file for complete search history.

(56) References Cited

U.S. PATENT DOCUMENTS

| 5,572,856 A * | 11/1996 | Ku | A01D 34/008 |
| | | | 56/2 |
| 9,265,196 B2 | 2/2016 | Albinger et al. | |
| 2016/0174459 A1* | 6/2016 | Balutis | B25J 9/1674 |
| | | | 701/25 |
| 2017/0020064 A1 | 1/2017 | Doughty et al. | |

(Continued)

FOREIGN PATENT DOCUMENTS

| EP | 1488296 B1 * | 4/2006 | A01D 34/008 |
| EP | 3225094 | 10/2017 | |
| WO | 2018158933 | 9/2018 | |

OTHER PUBLICATIONS

International Preliminary Report on Patentability for International Patent Application No. PCT/US2020/034787 dated Dec. 9, 2021, 8 pages long.

(Continued)

*Primary Examiner* — Jeff A Burke
*Assistant Examiner* — Arslan Azhar
(74) *Attorney, Agent, or Firm* — Wegman Hessler Valore

(57) ABSTRACT

Calibrating and optimizing settings of power equipment devices are detailed throughout this disclosure. A mobile device application can be connected with a control device of a power equipment, and data pertaining to current environmental conditions (e.g., turf moisture), turf characteristics (e.g., type of grass, etc.) or machine parameters can be entered into the mobile device application and utilized for generating improved setting value(s). Also disclosed are algorithms for correlating these conditions, characteristics and parameters with adjustment data for adjusting machine settings to achieve a desired performance of a power equipment device.

17 Claims, 10 Drawing Sheets

(56) References Cited

U.S. PATENT DOCUMENTS

| | | | | |
|---|---|---|---|---|
| 2017/0367257 A1* | 12/2017 | Cmich | ................. | A01D 34/736 |
| 2018/0213731 A1 | 8/2018 | Wykman et al. | | |
| 2018/0317368 A1* | 11/2018 | Du | ....................... | A01D 34/008 |
| 2018/0332765 A1* | 11/2018 | Doughty | .............. | G05D 1/0044 |
| 2019/0179326 A1* | 6/2019 | Uemoto | ............... | G05D 1/0231 |
| 2019/0208700 A1* | 7/2019 | Hahn | ................... | G05D 1/0225 |
| 2019/0230850 A1* | 8/2019 | Johnson | ............... | G05D 1/0287 |
| 2020/0000026 A1* | 1/2020 | Shoaf | .................... | A01D 69/02 |

OTHER PUBLICATIONS

International Search Report and Written Opinion for International Application No. PCT/US2020/034787 dated Aug. 13, 2020, 12 pages long.

* cited by examiner

DEVICE AND METHOD FOR CALIBRATING OUTDOOR POWER EQUIPMENT AND QUALITY OF CUT

CROSS REFERENCE TO RELATED PATENT APPLICATION

The present application for patent claims the benefit of priority of U.S. Provisional Patent Application No. 62/853,318 entitled Device and Method for Calibrating Power Equipment and Quality of Cut, and filed May 28, 2019, the disclosure of which is hereby incorporated by reference herein in its entirety and for all purposes.

FIELD OF DISCLOSURE

The disclosed subject matter pertains to apparatuses and methods for calibration of power equipment, for example, generating adjustment data for power equipment settings and achieving improvements to quality of cut of the power equipment.

BACKGROUND

Manufacturers of power equipment for outdoor maintenance applications offer many types of machines for general maintenance and mowing applications. Generally, these machines can have a variety of forms depending on application, from general urban or suburban lawn maintenance, rural farm and field maintenance, to specialty applications. Even specialty applications can vary significantly, from sporting events requiring moderately precise turf, such as soccer fields or baseball outfields, to events requiring very high-precision surfaces such as golf course greens, tennis courts and the like.

Professional turf managers spend significant time developing familiarity with the operating capabilities of the power equipment used to manage turf, particularly for specialty applications. Capabilities of these machines enable high quality turf maintenance, but can be very complex to understand and operate in a manner that consistently achieves high quality results. Further complicating matters is the effect of dynamic environmental conditions and weather. Different climates, seasons and weather can add further variance to the performance of outdoor power equipment. Significant experience is therefore generally required to successfully maintain high precision turf for multiple applications, in various climates and at differing times of the year.

BRIEF SUMMARY

The following presents a simplified summary in order to provide a basic understanding of some aspects of the disclosure. This summary is not an extensive overview of the disclosure. It is not intended to identify key/critical elements or to delineate the scope of the disclosure. Its sole purpose is to present some concepts of the disclosure in a simplified form as a prelude to the more detailed description that is presented later.

Provided herein, in one or more embodiments of the present disclosure, are devices and methods for calibrating and optimizing settings of power equipment apparatuses. In some embodiments, a mobile device application can be utilized to interface with a control device of a power equipment machine. Current settings of the power equipment can be entered into the application in conjunction with desired cut parameters. The mobile device application can generate one or more improved setting values to improve quality of cut for the machine. In some embodiments, current environmental conditions (e.g., turf moisture) or turf characteristics (e.g., type of grass, etc.) can be entered into the mobile device application and utilized for generating the improved setting value(s). In embodiments where the improved setting value(s) pertain to machine characteristics that can be automatically or robotically set by the control device of the machine, the mobile application can send the improved setting value(s) over a wired or wireless communication link with the control device. In other embodiments, for example where the machine characteristics are manually set, the improved setting value(s) can be displayed on a graphical display of a mobile device, enabling an operator to manually adjust the power equipment machine according to the improved setting value(s). In various embodiments, the mobile device application can be programmed with optimal settings for a given power equipment machine, and for a range of desired cut parameters, machine settings or environment or turf conditions, as provided herein, or as known in the art or as made known to one of ordinary skill in the art by way of the context provided by the present disclosure.

In further embodiments, the disclosure provides a system. The system can include a processor for executing instructions to perform operations of the system and a memory for maintaining the instructions executed by the processor. In various embodiments, the operations can comprise receiving, by the processor, input parameter data representing a characteristic pertaining to an instance of vegetation or a machine for mowing the vegetation. In additional embodiments, the operations can comprise determining, by the processor, a value of a mechanical parameter of the machine as a function at least in part of the input parameter data. In one or more other embodiments, the operations can comprise outputting, by the processor, additional data representing the determined value of the mechanical parameter of the machine.

To accomplish the foregoing and related ends, certain illustrative aspects of the disclosure are described herein in connection with the following description and the drawings. These aspects are indicative, however, of but a few of the various ways in which the principles of the disclosure can be employed and the subject disclosure is intended to include all such aspects and their equivalents. Other advantages and features of the disclosure will become apparent from the following detailed description of the disclosure when considered in conjunction with the drawings.

Figure 1:
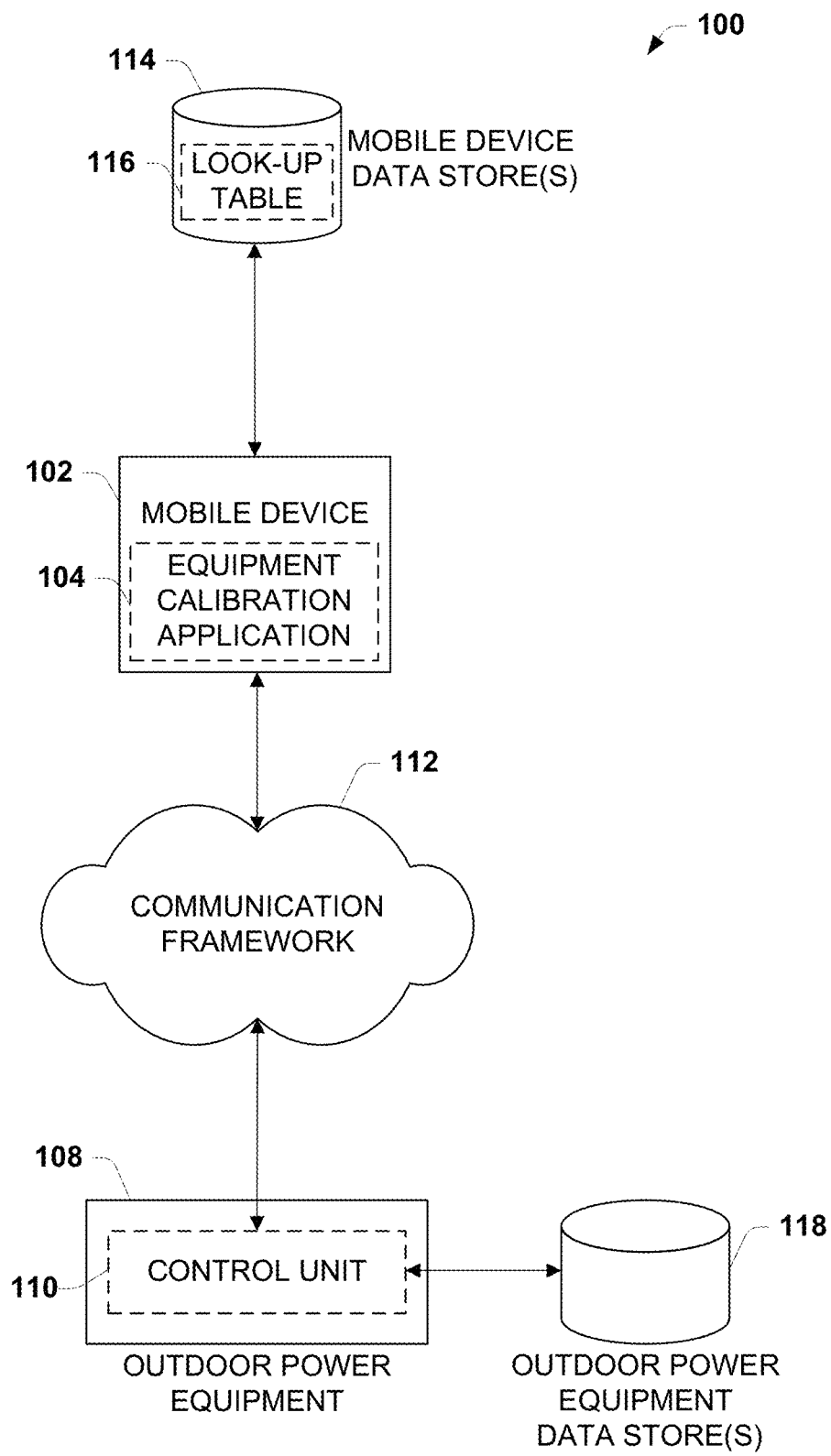
FIG. 1 illustrates a block diagram of an example system for obtaining an improved performance for power equipment machines, in disclosed embodiments.

It should be noted that the drawings are diagrammatic and not drawn to scale. Relative dimensions and proportions of parts of the figures have been shown exaggerated or reduced in size for the sake of clarity and convenience in the drawings. The same reference numbers are generally used to refer to corresponding or similar features in the different embodiments, except where clear from context that same reference numbers refer to disparate features. Accordingly, the drawings and description are to be regarded as illustrative in nature and not as restrictive.

While embodiments of the disclosure pertaining to equipment calibration and improved quality of cut for power equipment machines are described herein, it should be understood that the equipment calibration applications, devices and methods are not so limited and modifications may be made without departing from the scope of the present disclosure. The scope of the systems, methods, mobile devices and mobile applications for calibrating outdoor power equipment are defined by the appended claims, and all devices, processes, and methods that come within the meaning of the claims, either literally or by equivalence, are intended to be embraced therein.

DETAILED DESCRIPTION

The following terms are used throughout the description, the definitions of which are provided herein to assist in understanding various aspects of the subject disclosure.

As used in this application, the terms "outdoor power equipment", "outdoor power equipment machine", "power equipment", "maintenance machine" and "power equipment machine" are used interchangeably and are intended to refer to any of robotic, ride-on, walk-behind, sulky equipped, autonomous, remote control, or multi-function variants of any of the following: powered carts and wheel barrows, lawn mowers, lawn and garden tractors, lawn trimmers, lawn edgers, lawn and leaf blowers or sweepers, hedge trimmers, pruners, loppers, chainsaws, rakes, pole saws, tillers, cultivators, aerators, log splitters, post hole diggers, trenchers, stump grinders, snow throwers (or any other snow or ice cleaning or clearing implements), lawn, wood and leaf shredders and chippers, lawn and/or leaf vacuums, pressure washers, lawn equipment, garden equipment, driveway sprayers and spreaders, and sports field marking equipment.

FIG. 1 illustrates a block diagram of an example computing environment 100 operable in conjunction with various aspects of the present disclosure. Computing environment 100 can comprise one or more mobile devices 102 communicatively coupled with an outdoor power equipment 108 by way of a communication framework 112. The mobile device(s) 102 can include devices adapted to operate in response to command or data input at a user interface, or can be adapted to operate in response to command or data input from another computing device, housed together with mobile device(s) 102 or located remotely from mobile device(s) 102 and connected by a communication or operation interface, including one or more communication networks. For instance, mobile device(s) 102 can be implemented as a smart phone, tablet, personal digital assistant (PDA), laptop, or most any other network-enabled computing device (e.g., see FIG. 5, infra). An equipment calibration application 104 may be stored (e.g., in mobile device data store(s) 120; in a cloud server, etc.) and executed on the mobile device 102 (e.g., from an operating memory or system memory of mobile device(s) 102—not depicted, but see FIG. 5 or analogous mobile device memory structures known in the art or made known to one of skill in the art by way of the context provided herein). Equipment calibration application 104 may be retrieved from a mobile application store, such as a network service providing applications compatible with the iOS system by Apple Computer, the Android mobile device operating system, or other suitable operating system for a mobile computing device.

The equipment calibration application 104 on the mobile device(s) 102 communicates with a control unit 110 of outdoor power equipment 108. One possible communication between a mobile device 102 and a control unit 110 may be in the form of a data packet adapted to be transmitted between two or more computer processes. The equipment calibration application 104 can establish a connection with the control unit 110, and can retrieve data, store data, submit processing requests, provide data in conjunction with a processing request, and the like.

As illustrated, communication framework 112 facilitates the communication between mobile device 102 and control unit 110 of outdoor power equipment 108.

Communication framework 112 will typically be a short range wired or wireless network, though the subject disclosure is not limited to such embodiments. Rather, in various embodiments communication framework 112 can include wired/wireless connectivity to a local area network (LAN) or larger networks, e.g., a wide area network (WAN) which may connect to a global communications network, e.g., the Internet. As more specific examples, communication framework 112 can provide communication utilizing: any suitable private or commercial cellular voice or data network (second generation (2G), 3G, 4G, WiMAX, 4G long term evolution (LTE), 5G, and so forth), a satellite voice or data network, Bluetooth®, or Wi-Fi technology IEEE 802.11(a, b, g, n, . . . ), infrared, Ultra Wideband (UWB), or a wired connection such as a universal serial bus (USB) connection, Ethernet connection (e.g., Cat 3, Cat 5, Cat 5e, Cat 6, Cat 6A, and others), or the like, or a suitable combination of the foregoing. Data may be communicated between and among the mobile device 102, the equipment calibration application 104, control unit 110 and the outdoor power equipment 108 via the communication framework 112 utilizing networks, which are accessible to a user and are compatible with the mobile device(s) 102 and with control unit 110 of outdoor power equipment 108.

In operation, equipment calibration application 104 can be programmed to acquire or generate calibration data for outdoor power equipment 108. The equipment calibration application 104 can employ a variety of data pertaining to outdoor power equipment 108 to execute this programming. Moreover, this data can be input by a user of mobile device(s) 102, retrieved from mobile device data store(s) 114, retrieved from control unit 110 of outdoor power equipment 108, or retrieved from outdoor power equipment data store(s) 118, or a suitable combination of the foregoing.

Data utilized by equipment calibration application 104 can include identifiers for distinguishing among different types of outdoor power equipment 114 (e.g., model number(s), serial number(s), manufacturer identifier(s), and so forth). Equipment calibration application 104 can also utilize data pertaining to mechanical parameters of outdoor power equipment 114, which can vary as a function of type of outdoor power equipment 114. As utilized herein, a mechanical parameter refers to any fixed or adjustable physical characteristic of outdoor power equipment 114. Mechanical parameters can often vary per type of outdoor power equipment 114. For instance, in the case of an Infinicut walk-behind lawnmower, mechanical parameters employed by equipment calibration application 104 can include: a height of cut setting, a cutting reel of a set of cutting reel cassettes, a rear roller position, a bedblock eccentricity angle, a number of blades on a bedknife, a bedknife attitude angle, a behind center distance (BCD) of bedknife setting, a reel motor counterbalance of a set of reel motor counterbalances, a parallelism metric of the bedknife, a drive speed (e.g., a translational speed or walking speed of the outdoor power equipment 114 relative to ground as a constant), a cutting reel speed, a frequency of clip metric, or the like or a suitable combination of the foregoing (e.g., see FIG. 5, infra). In further embodiments, equipment calibration application 104 can be programmed to incorporate data pertaining to environmental conditions, type of vegetation being cut, vegetation load on a bedknife, as well as other suitable machine parameters, environmental parameters, vegetation parameters, etc.

In some embodiments, mobile device data store(s) 114 can comprise a database (e.g., embodied as a look-up table 116 in FIG. 1) that stores calibration settings for respective groups of mechanical parameters for a variety of types or models of outdoor power equipment 108 (e.g, one or more groups of mechanical parameter settings per type of outdoor power equipment 108). Further, the database or look-up table 116 (referred to hereinafter as look-up table 116) can comprise adjustment data as a function of one or more input conditions. As an example, the look-up table 116 can be programmed to generate optimal data for a mechanical parameter setting(s) as a function of one or more input conditions or constraints. Suitable input conditions can include, but are not limited to achieving a desired performance metric for a current mechanical parameter setting (e.g., a current height-of-cut setting), as a function of one or more input parameters. Suitable input parameters can include, but are not limited to, data representing: a type of outdoor power equipment 108, an environmental condition(s), a fixed mechanical parameter(s) or fixed mechanical parameter setting(s), an adjustable mechanical parameter(s) or adjustable mechanical parameter setting(s), an interchangeable part(s) (e.g., a cutting reel, a counterbalance, and so forth), a target output result for the outdoor power equipment 114 (e.g., a target height of cut, or similar), or other suitable input parameters, or a suitable combination of the foregoing. Thus, as one illustrative example, the look-up table 116 can be programmed to store or generate an adjustment to a first mechanical parameter setting (e.g., a frequency of clip) in response to input parameter data specifying: a current value of the mechanical parameter, a given type of machine (e.g., Infinicut lawnmower), a particular environmental condition (e.g., current turf moisture), and a target output result (e.g., a target height-of-cut, etc.) for a set of fixed mechanical parameter values (e.g., cutting reel speed and drive speed). As another illustrative example, the look-up table 116 can be programmed to generate optimal setting data for the first mechanical parameter setting in response to input parameter data specifying: the type of machine, the particular environmental condition and a target output result for a given cutting reel speed and drive speed. Examples of other output results for different combinations of input data (input parameters and input conditions) are described herein; however, these are in no way limiting and the scope of the disclosure is intended to encompass all suitable combinations of input parameters, conditions and the like, and all suitable adjustment data outputs or optimization data outputs disclosed herein or that would be reasonably conveyed to one of ordinary skill in the art given a suitable expertise and knowledge of the art.

Utilizing the communication framework 112 equipment calibration application 104 executed by mobile device 102 can access and acquire data pertaining to outdoor power equipment 108 stored in outdoor power equipment data store(s) 112. Data can be acquired directly by equipment calibration application 104 in some embodiments, or with control unit 110 serving as a data server in other embodiments. In specific embodiments, equipment calibration application 104 can acquire data identifying outdoor power equipment 108 (e.g., by manufacturer, model number, part number, serial number, etc.) or components thereof, as well as data values of one or more mechanical parameters of outdoor power equipment 108. As a non-limiting example, the data values can be limited to current mechanical parameter settings for some embodiments, whereas in other embodiments the data values can include non-current mechanical parameter settings as well (e.g., previous values, or values to be programmed at a future time).

Acquired mechanical parameter values can be imported to equipment calibration application 104. Further, one or more mechanical parameter values can be populated to an application display graphic associated with equipment calibration application 104 on a graphical display of mobile device 102 (see FIG. 2, infra). User input at a user input interface of mobile device 102 can facilitate user data entry to equipment calibration application 104. The user data entry can facilitate data input for other mechanical parameters of outdoor power equipment 108 (e.g., with data values that are not stored by outdoor power equipment data store(s) 118 or control unit 110), or for other input parameters of equipment calibration application 104 (e.g., environmental condition data, vegetation data such as a type of grass being cut, etc.) or for a user to issue commands to equipment calibration application 104, such as calculate an adjustment/optimization setting, save current settings, or the like.

After receipt of input parameter data, a "calculate" command can be received at the user input interface of mobile device 102. In response, equipment calibration application 104 references a look-up table 116 in mobile device data store(s) 114. Adjustment data or optimization data for one or more mechanical parameters correlated to the input parameter data can be read out from look-up table 116. This adjustment/optimization data can be transferred to suitable data fields of control unit 110 of outdoor power equipment 108 in some embodiments (e.g., where the one or more mechanical parameters are auto-adjustable by control unit 110), or can be output on a graphical display of mobile device 102 in other embodiments (e.g., where the one or more mechanical parameters are manually adjusted), or a combination of the foregoing in still other embodiments (e.g., where one mechanical parameter(s) is auto-adjustable and another is manually adjustable).

Generally, control unit 110 can be programmed to save auto-adjustment mechanical parameter values of outdoor power equipment 108 at outdoor power equipment data store(s) 118. Examples of auto-adjustable mechanical parameters can vary per type of outdoor power equipment 108. For instance, in some outdoor power equipment a drive speed (or walking speed) can be automatically set and adjusted by control unit 110, whereas in other outdoor power equipment the drive speed can be manually set by an operator of outdoor power equipment 108. In some embodiments, manually adjusted mechanical parameters can be automatically detected by control unit 110 and stored in outdoor power equipment data store(s). For instance, in one example a set of cutting reel cassettes can have different mechanical or electro-mechanical connection interfaces to outdoor power equipment 108, and although interchangeability of cutting reel cassette can be a manually adjusted mechanical parameter, control unit 110 can detect an identifier for a type of cutting reel cassette that is manually coupled to the connection interface(s) based on the differing connection interfaces. Control unit 110 can consequently store the identifier for the detected cutting reel cassette as a stored parameter in outdoor power equipment data store(s) 118. This stored identifier can also be acquired by equipment calibration application 104, in some embodiments.

In a further embodiment, mechanical parameters stored in outdoor power equipment data store(s) 112 can be read by control unit 110 upon startup of outdoor power equipment. Accordingly, adjustments to stored mechanical parameter values saved in outdoor power equipment data store(s) 118 can be initiated for subsequent uses of outdoor power equipment 108.

Figure 1A:
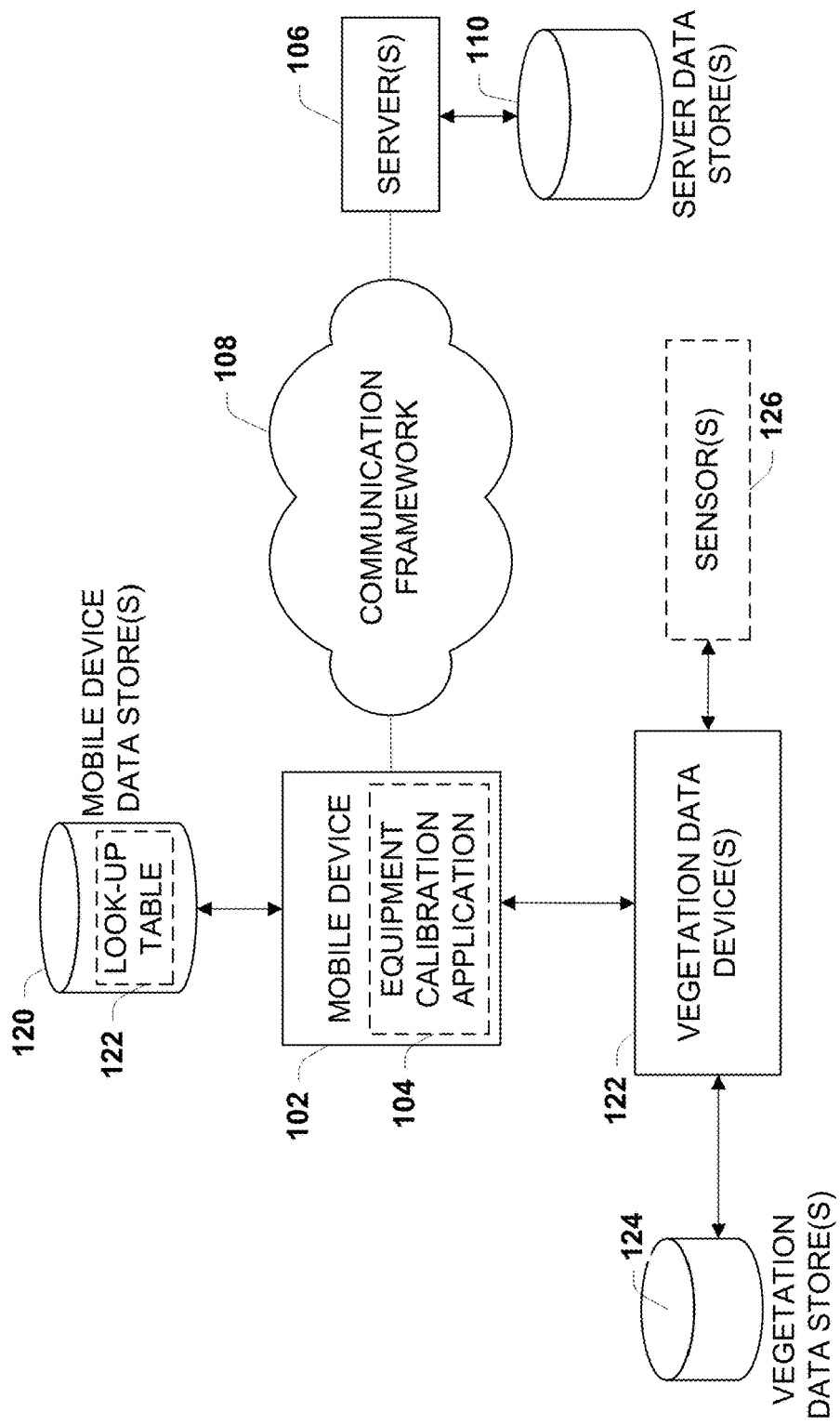
FIG. 1A illustrates a block diagram of an example system for acquiring vegetation data for a disclosed device application, in alternative or additional embodiments.

FIG. 1A illustrates a block diagram of an example network environment 100A according to alternative or additional aspect of the present disclosure. Network environment 100A provides vegetation data by way of a data server device 122. In some embodiments, data server device 122 can include a data acquisition device (e.g., one or more data acquisition device/sensor(s) 126) configured to generate data pertaining to vegetation for which an outdoor power equipment is to be calibrated. In other embodiments, data server device 122 can be a server providing access to such data stored in a vegetation data store(s) 124 that is acquired or generated by external acquisition device/sensors 126. In all such embodiments, vegetation data can be provided to equipment calibration application 104 on mobile device 102, either in addition to or as an alternative to user entry of vegetation data.

Vegetation data can include various information pertinent to the effects of operating an outdoor power equipment 108 on vegetation. Examples include moisture content, atmospheric humidity, ambient temperature, vegetation chlorophyll content, vegetation stress metrics, types of vegetation, and so forth. The vegetation data can be measured, calculated, generated, etc. by a variety of data acquisition devices 126, including moisture sensors, cameras, and the like. The data acquisition devices 126 can be mounted on outdoor power equipment 108, in some embodiments, installed in fixed positions among portions of the vegetation, in other embodiments, fixed to mobile machines that move above and scan the vegetation (e.g., aerial drones) in still further embodiments, or can be satellite devices in suitable planetary orbit, in yet additional embodiments. In the latter embodiment, data server device 122 can be a private or public server device where satellite imagery or satellite sensor measurements are made available through suitable Application Programming Interfaces (APIs), or the like.

An example of a suitable data acquisition device 126 for vegetation can be an aerial or ground-based drone having a multispectral camera, or set of multispectral cameras. Spectra that can be suitable for capture consistent with disclosed embodiments include green, red, red-edge and near-infrared spectra, as a particular example, providing data capture of both visible and invisible (near-infrared) data of vegetation. Through analysis of the captured spectral data, information such as photosynthetic activity, plant cover, plant and soil moisture, plant stress, or the like, or a suitable combination of the foregoing can be calculated and stored in vegetation data store(s) 124. Moreover, the spectral data can be captured in multiple instances of time (e.g., periodically, non-periodically, etc.) and changes in the vegetation characteristics can be analyzed as a function of time, including time periods having environmental significance (e.g., time of day, day of the week, season of the year, and so on) or aperiodic times (e.g., a random time, a generic time, and so forth). Additional sensor embodiments (e.g., camera(s) mounted on outdoor power equipment 108, moisture sensors embedded in soil, manual sensor measurements utilizing a hand-carried pole sensor with moisture measuring tip, or the like) can acquire vegetation data and store the data in vegetation data store(s) 124, or provide the data to equipment calibration application 104, as suitable.

In various embodiments, equipment calibration application 104 can be programmed to analyze vegetation data and generate one or more inferences from such analysis. As one example, equipment calibration application 104 can be configured to infer an increase in plant stress in response to a reduction in photosynthetic activity (e.g., for constant or substantially constant light levels). Plant stress can result from a variety of conditions, including foot traffic, vehicle traffic, drought, pest or disease infestation, anaerobic conditions, and so forth. Further, equipment calibration application 104 can be configured to analyze vegetation data as a function of ground area. Where photosynthetic reduction is area dependent, equipment calibration application 104 can be configured to generate a recommendation for outdoor power equipment 108 to increase height-of-cut for affected areas of vegetation, where outdoor power equipment 108 is a mowing device, for instance. In another instance, where outdoor power equipment 108 is a de-thatching device, equipment calibration application 104 can generate a recommendation to turn off de-thatching of outdoor power equipment 108 over affected areas with reduced photosynthetic activity, and to turn on thatching over areas having normal photosynthetic activity.

In another example, equipment calibration application 104 can be configured to acquire vegetation moisture content from vegetation data stored at vegetation data store(s) 124. A reel speed adjustment can be generated by equipment calibration application 104 based at least in part on the vegetation moisture content. In at least one embodiment, where moisture content as a function of area is included in vegetation data, the reel speed can be adjusted in operation (e.g., where automatic adjustment is available) as outdoor power equipment 108 approaches or covers areas of changing moisture content, as indicated by the vegetation data.

In still further embodiments, equipment calibration application 104 can be programmed to achieve a target grass throw property for outdoor power equipment 108 embodied as mowing devices. In such embodiments, where vegetation data indicates the turf stand leaf is at a given moisture level, equipment calibration application 104 could generate an optimal reel speed to achieve target grass throw properties. During punch tine aeration, as another example, equipment calibration application 104 could be programmed to target dry areas of vegetation more aggressively compared to areas with higher (e.g., normal) moisture, thereby achieving greater penetration points when applying surfactants to aid water absorption. It should be appreciated that other mechanisms for acquiring or generating vegetation data, and other inferences for operating outdoor power equipment 108 from such data can be programmed to equipment calibration application 104, as would be understood by one of ordinary skill in the art in conjunction with the context and teachings of the present disclosure.

Referring back to FIG. 1A, sensors 126 that acquire vegetation data can provide the data to equipment calibration application 104 via a communication interface (e.g., communication framework 112), in an embodiment. In other embodiments, the sensors can store the vegetation data in vegetation data store(s) 124. In the latter embodiments, the data can be accessed by way of a vegetation data server device(s) 122, which can retrieve stored data and provide the stored data to equipment calibration application 104.

Figure 2:
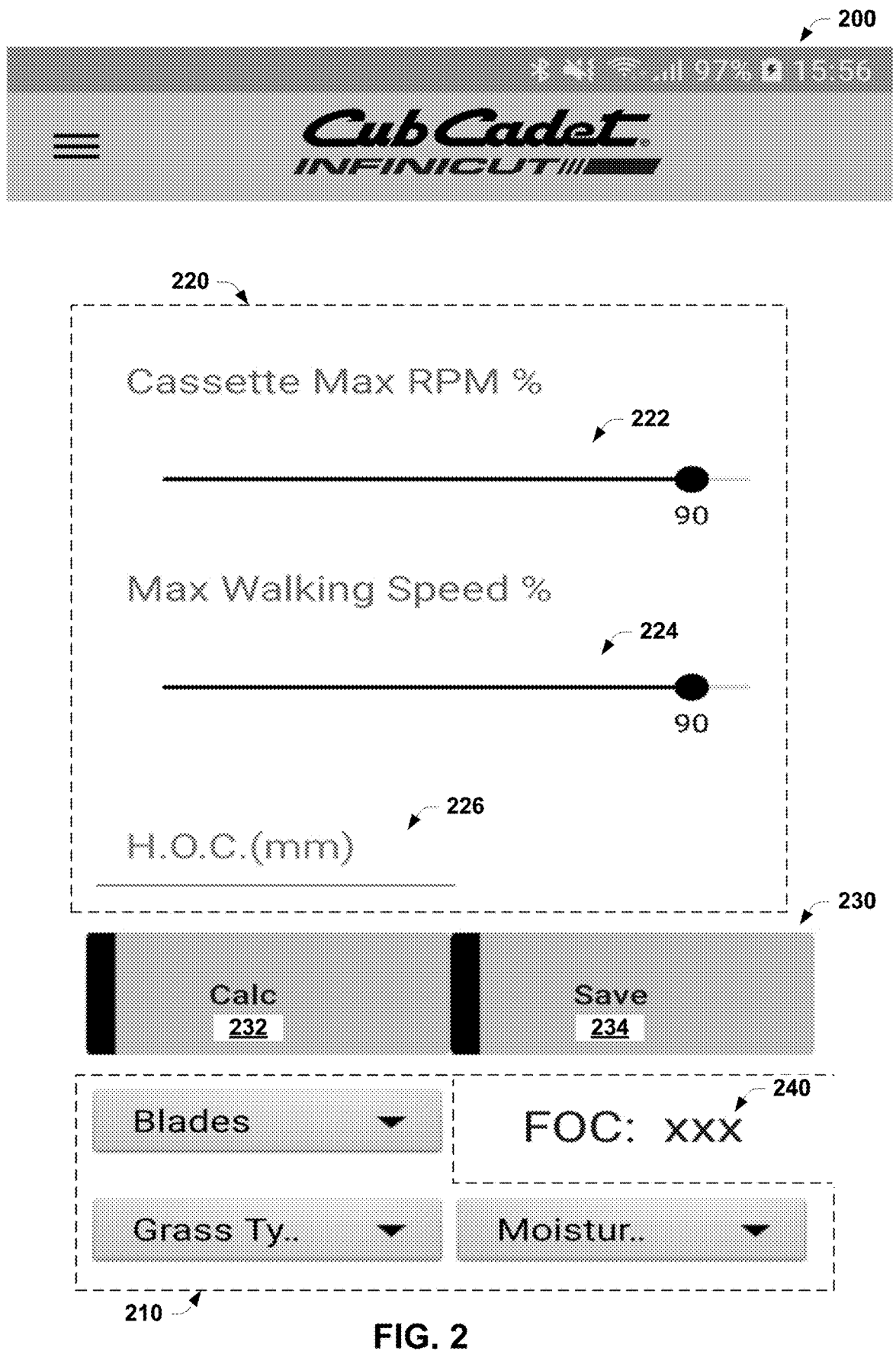
FIG. 2 depicts a diagram of a sample application user interface for a mobile device application for generating improved power equipment settings, in further embodiments.

FIG. 2 illustrates a diagram of an example user interface for an example equipment calibration application 200. Equipment calibration application 200 can be adapted to operate on a smartphone, tablet or other mobile computing device, although the subject disclosure is not limited to this embodiment. Equipment calibration application 200 contains data input fields for user data entry, including drop down selection fields 210 as well as slide bar and value entry fields 220. Additionally, command buttons 230 are provided, as well as a calculated data output field 240.

For the example embodiment of equipment calibration application 200 illustrated in FIG. 2, drop down selection fields 210 can be programmed to include a number of blades (including a number of blade selections), a grass type (including programmed types of grasses) and moisture content (including degrees of moisture content). The moisture content can be a qualitative or quantitative metric, in various embodiments. For example, in at least one non-limiting embodiment the moisture content can be selected as low, medium or high moisture, though other qualitative (or quantitative) metrics for identifying moisture content of turf are within the scope of the present disclosure.

Slide bar and value entry fields 220 include two slide bars: one indicating a percentage of cassette maximum reel speed (in RPM %) 222, and a second indicating a maximum walking speed (in %) 224. Additionally, a height of cut field (in millimeters (mm)) is also provided, enabling a user to specify height of cut as a mechanical parameter input constraint. Once suitable data is entered, the calculate command 232 is entered, and equipment calibration application 200 determines a frequency of clip value and display the frequency of clip value in the calculated data output field 240. A user can enter the save command 234, causing equipment calibration application 200 to update a data field of a control unit corresponding to the frequency of clip mechanical parameter to the frequency of clip value displayed in the calculated data output field 240. The outdoor power equipment so adjusted will then operate at the new frequency of clip value. Moreover, equipment calibration application 200 can cause the new frequency of clip value to be stored in an associated outdoor power equipment data store (e.g., 118 of FIG. 1, supra). When the control unit powers on the outdoor power equipment for future operation, values stored in the outdoor power equipment data store can be loaded into the control unit for operation.

It should be appreciated that many other embodiments of equipment calibration application 200 are within the scope of the present disclosure. Different numbers and types of data entry fields can be provided, as well as different commands. Further, different mechanical parameter settings can be calculated in some embodiments, including a user-selectable mechanical parameter(s) of a set of mechanical parameters for calculation (e.g., a drop-down list or the like allowing a user to select a mechanical parameter for calculation). Furthermore, different types of outdoor power equipment can have different user interfaces, different input parameters, different calculated/output parameters or different commands. In at least one embodiment, equipment calibration application 200 can allow a user to select from multiple types of outdoor power equipment, and the user interface as well as input data, calculated data or commands can vary as a function of selected outdoor power equipment type. These and other embodiments are considered within the scope of the present disclosure.

Figure 3:
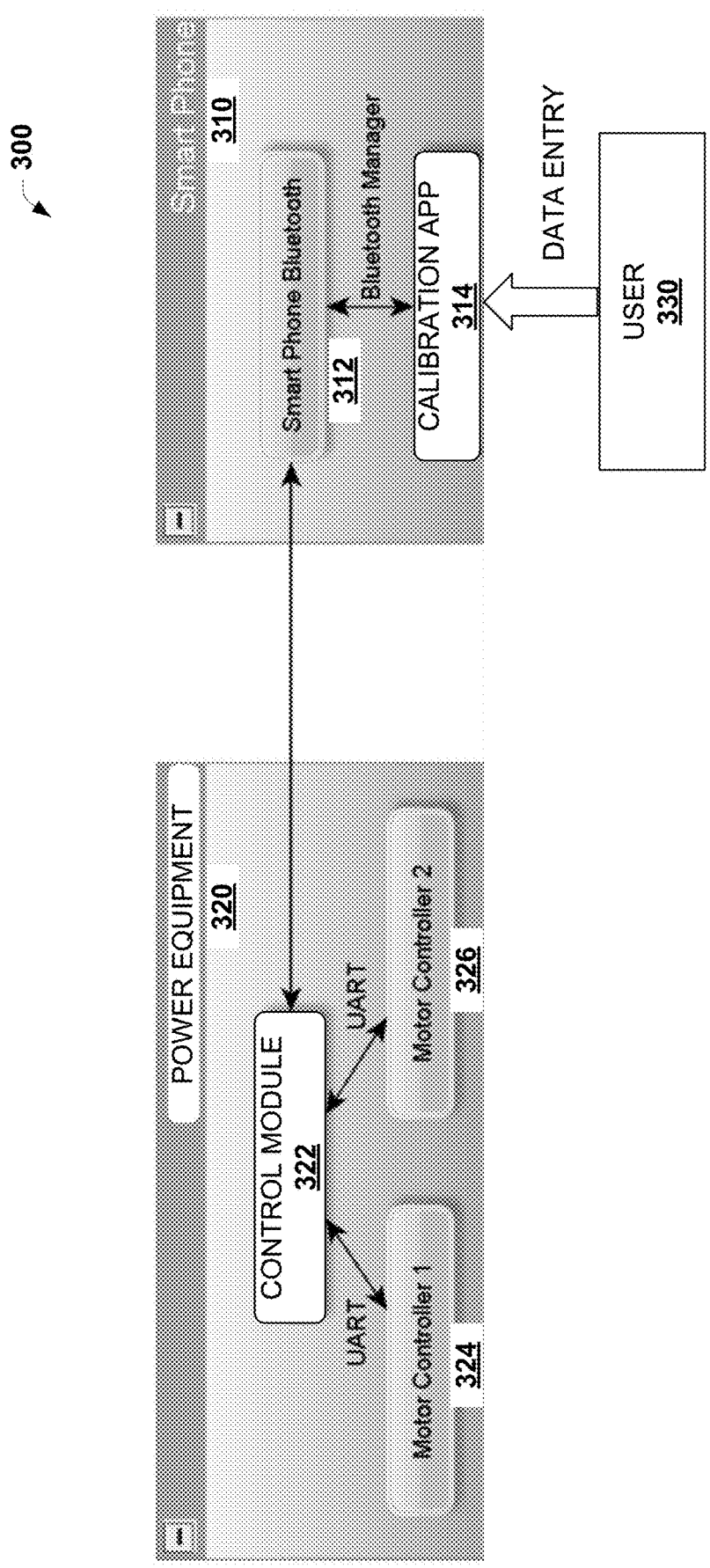
FIG. 3 illustrates a diagram of an example system for connecting a smart phone with a mowing machine according to one or more disclosed embodiments.

FIG. 3 illustrates a diagram of an example power equipment calibration environment 300 in one or more additional embodiments of the present disclosure. Power equipment calibration environment includes a smart phone 310 communicatively coupled with a control module 322 of a power equipment 320 by way of a wireless Bluetooth connection. A smart phone Bluetooth manager 312 can facilitate interconnection of a calibration application 314 with the control module 322. A user 330 can interact with the calibration application 314 as described herein, utilizing a user interface of smart phone 310. In the depicted example of power equipment calibration environment 300, calibration application 314 can be utilized to adjust or optimize one or more adjustable mechanical parameters 324, 326 of power equipment 320. Although power equipment 320 explicitly depicts motor controller 1 and motor controller 2 as adjustable mechanical parameters 324, 326, these are illustrative examples only, and are not provided to limit the scope of the adjustable mechanical parameters envisioned within the scope of the present disclosure. Bluetooth manager 312 provides a suitable mechanism for calibration application 314 to communicate with, provide data to, receive data from, issue commands to and receive commands from, control module 322. As such, Bluetooth manager 312 is one suitable example of a communication framework (e.g., 112 etc.) to interconnect calibration application 314 with control module 322 to implement features of the disclosed subject matter. Other suitable wired or wireless communication frameworks, as well as other computing device 310 are considered within the scope of the present disclosure.

Figure 4:
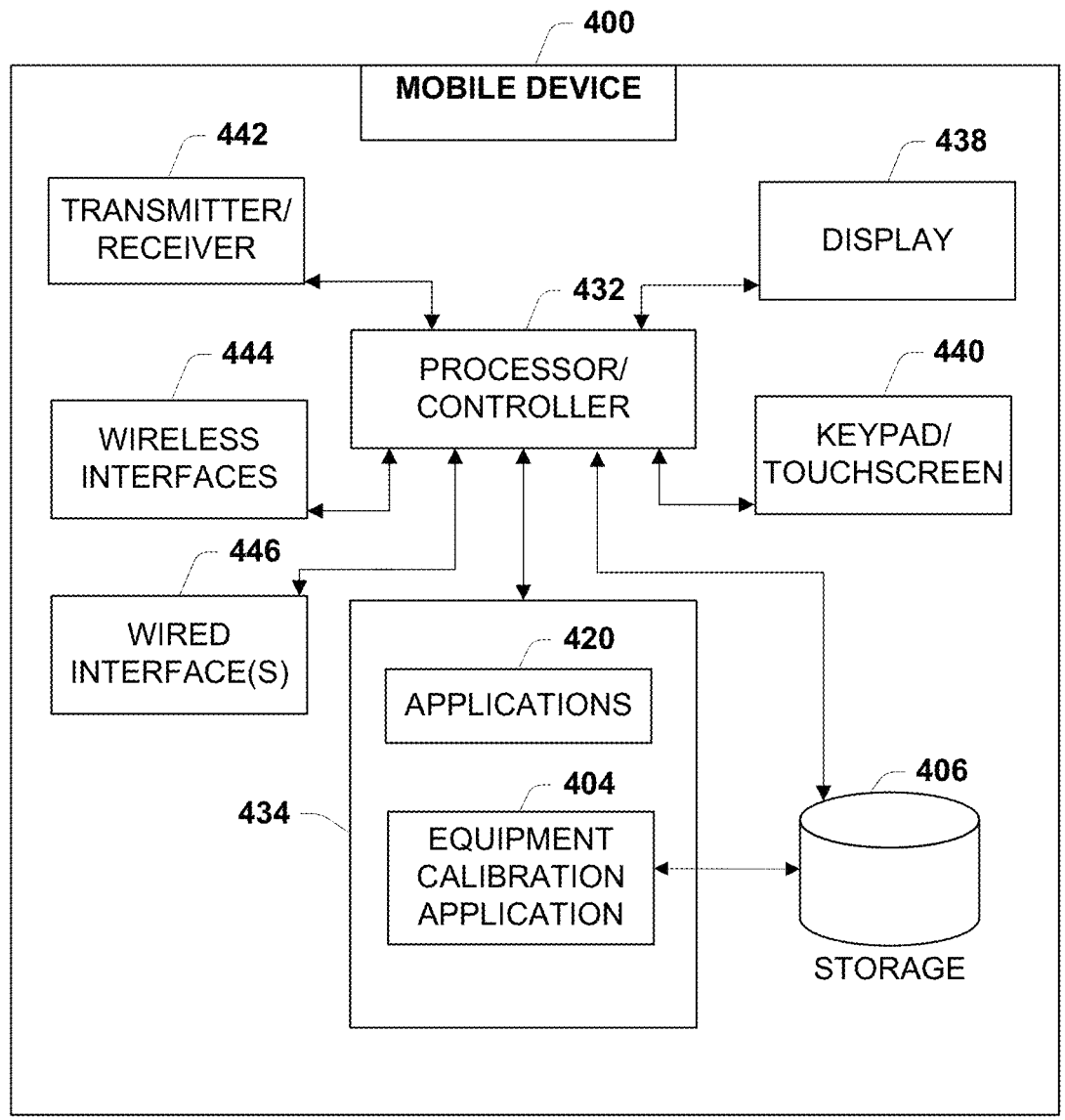
FIG. 4 illustrates a block diagram of a sample mobile device for implementing one or more disclosed embodiments.

FIG. 4 is a functional block diagram of a mobile device 400. The mobile device 400 includes a controller 432 that controls the overall operation of the mobile device 400. The controller 432 can include most any commercially available or custom microprocessor or micro controller. Memory 434 is operatively connected to the controller 432 for storing control programs, applications, and data (collectively, applications 420) used by the mobile device 400. The mobile device 400 can be configured to run the equipment calibration application 404, handle voice communications, transmit, receive and process data, such as sensor data, map data, text messages, electronic mail messages, image files, video files, audio files, and the like.

Memory 434 is operatively connected to the controller 432 for storing applications, control programs and data used by the mobile device 400. The memory 434 is representative of the overall hierarchy of memory devices containing software and data used to implement the functionality of the mobile device 400 in accordance with one or more aspects described herein. The memory 434 can include, for example, RAM or other volatile solid-state memory, flash or other non-volatile solid-state memory as operational memory, and mobile device 400 can also include storage 406, such as a magnetic storage medium, disk storage, optical storage, removable storage media, or other suitable storage means.

In an embodiment, the memory 434 stores application programs 420, including an equipment calibration application 404, and application program data. The application programs 420, including the equipment calibration application 404, can access software routines, stored in the memory 434, and in the data stores 406, via the controller 432, for communicating with devices such as the display 438 and the keypad/touch screen 440, input/output ports, the transmitter/receiver 442, wireless interface(s) 444, wired interface(s) 446, a location determination element, such as a global positioning system (GPS), and most any other user interface components and/or devices.

The application programs 420, including the equipment calibration application 404, comprise programs that implement various features of the mobile device 400, such as voice calls, e-mail, Internet access, multimedia messaging, contact manager and the like. The equipment calibration application 404 comprises a program, logic routine or code that provides users with on-demand operational status, maintenance records, maintenance activity alerts/notifications, access to operator's manuals, and instructions concerning critical and non-critical components and operation of outdoor power equipment as described herein (e.g., outdoor power equipment 108 of FIG. 1, supra, among others disclosed herein). In an embodiment, the equipment calibration application 404 comprises an interactive program wherein information is provided or exchanged between a user via the mobile device 400 and the outdoor power equipment 108 in real-time, in conjunction with calibrating one or more mechanical parameters of outdoor power equipment 108, as a function of input parameters, constraints or performance metrics as described herein. In other embodiments, information can be provided or stored for later retrieval.

In particular embodiments, wireless interfaces 444 of the mobile device 400 can include one or more local wireless interfaces 444, such as an infrared transceiver or an RF adapter, for example, a Bluetooth® adapter, WLAN adapter, Ultra Wideband (UWB) adapter and the like, or suitable combinations thereof, for establishing communication with a network, an intranet, the Internet, the outdoor power equipment 108, an accessory, another mobile device, a computer, or most any other electronic device. Wireless interfaces 444 can additionally include an interface suitable for communication within a cellular network or other wireless wide-area network. Wired interfaces 446 can be employed as an alternative to, or in addition to, wireless interfaces 444 in at least some disclosed embodiments. Wired interfaces 446 can include a USB interface, Ethernet interface, a proprietary interface (e.g., a power and data port compatible with Apple Computer mobile devices 400), or the like or suitable combinations of the foregoing.

The transmitter/receiver 442 and the wireless interface(s) 444 can include transmit and receive circuitry, and a serial interface for communication with the controller 432. The mobile device 400 can also include one or more suitable antennas (not shown) coupled to the transmitter/receiver 442 or wireless interfaces 444 for receiving and transmitting signals. In an embodiment, the transmitter/receiver 442 and the wireless interfaces 444 can be combined in a component.

In further embodiments, applications 420 of mobile device 400 can include instructions executed by processor/controller 432 to implement operations of mobile device 400. These operations can comprise receiving, by the processor 432, input parameter data representing a characteristic pertaining to an instance of vegetation or a machine for mowing the vegetation. The instance of vegetation can include grass or other ground vegetation in various embodiments, but is not limited to these embodiments and can include bushes, weeds, hedges, trees and various other vegetation that can be mowed, cut, trimmed or otherwise maintained by outdoor power equipment (e.g., the machine for mowing the vegetation). The machine for mowing the vegetation can include any suitable outdoor power equipment 108 adapted for mowing vegetation, according to various embodiments. The operations can further comprise determining, by the processor 432, a value of a mechanical parameter of the machine as a function at least in part of the input parameter data and outputting, by the processor 432, additional data representing the determined value of the mechanical parameter of the machine.

In an additional embodiment(s), the operations can comprise establishing, by way of the wireless interfaces 444 or wired interface(s) 446, a communication link with an electronic control device of the machine. The operations can also comprise updating, by the communication link, a data field of the electronic control device with the additional data representing the determined value of the mechanical parameter of the machine. In still another embodiment, the electronic control device of the machine can be operable to adjust operation of the machine consistent with the determined value of the mechanical parameter of the machine. Where the wireless interfaces 444 are employed to couple the mobile device 400 to the electronic control device the communication link can be a wireless communication link, and alternatively where the wired interface(s) 446 is employed to couple the mobile device 400 to the electronic control device, the communication link can be a wired communication link. In at least some embodiments, a combination of a wired and wireless communication link can be utilized to interconnect the mobile device 400 the electronic control device of the machine.

In another embodiment, outputting the additional data representing the value of the determined mechanical parameter of the machine can comprise displaying the additional data on the graphical display unit 438 of mobile device 400 in response to determining the mechanical parameter of the machine. This embodiment can be implemented where the mechanical parameter is manually adjusted by a user of mobile device 400 and of the machine, as an example.

In one or more specific embodiments, the characteristic pertains to the instance of vegetation and includes a type of grass associated with the vegetation or a moisture content associated with the vegetation (e.g., moisture content of turf, dirt, ground, etc. on which the vegetation is growing). Alternatively or in addition, the characteristic can pertain to the machine for mowing the vegetation and include a number of cutting blades on a cutting reel of the machine, a target height of cut of the machine, or a drive speed of the machine. As yet other examples, the determined value of the mechanical parameter of the machine is a first value of a frequency of clip of the machine or a second value of a cutting reel speed of the machine. In at least one embodiment, the additional data can include both the first value and the second value. In yet other examples, the determined value of the mechanical parameter of the machine is selected from a group consisting of: a first value of a frequency of clip of the machine, a second value of a cutting reel speed of the machine, a third value of a rear roller position of the machine, a fourth value of a bedknife attitude angle of the machine and a fifth value of a cutting reel cassette identifier of a set of cutting reel cassette identifiers. For instance, the determined value of the mechanical parameter of the machine can include two or more values selected from the foregoing group. In some embodiments, the determined value of the mechanical parameter can be a similar mechanical parameter and value, or any suitable combination of the foregoing.

In another embodiment consistent with the scope of the present disclosure, mobile device 400 can comprise a look-up table stored in memory 434. The look-up table can associate mechanical parameter values to values of two or more of the characteristics pertaining to the instance of vegetation or the machine, wherein determining the value of the mechanical parameter at least in part comprises reading the lookup table and acquiring mechanical parameter information associated by the lookup table with values of the two or more characteristics indicated by the input parameter data.

Figure 5:
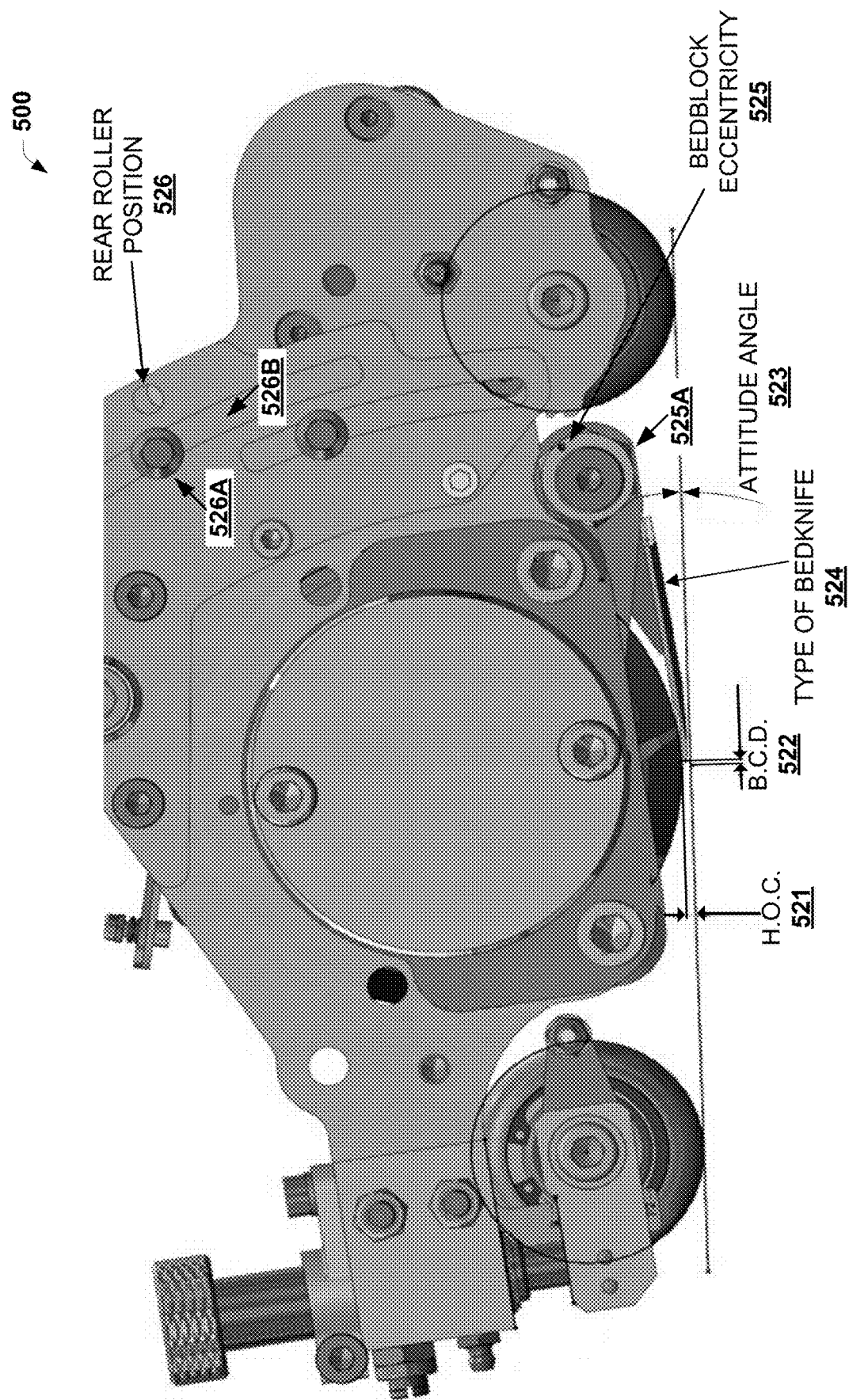
FIG. 5 depicts a block diagram of a sample power equipment and adjustable machine parameters for achieving a desired quality of cut, in an embodiment(s).

FIG. 5 illustrates an example outdoor power equipment 500 according to aspects of the present disclosure. Outdoor power equipment 500 can be embodied as a walk-behind lawnmower, in some embodiments, a riding lawnmower, in other embodiments, or a robotic lawnmower in still other embodiments. Still further embodiments can embody outdoor power equipment 500 as yet another machine consistent with at least a subset of the features and functions of the subject disclosure.

Outdoor power equipment 500 depicts a number of mechanical parameters that can be optimizable or adjustable parameters, in some embodiments, or can be input constraints in other embodiments. Examples of mechanical parameters include height-of-cut 521, which defines a distance between ground and a position above ground at which blades of a cutting reel of outdoor power equipment 500 physically contact vegetation on the ground. The definition of ground as utilized herein is a surface on which translational or rotational members (e.g., wheels, rollers, tracks, rails, etc.) of outdoor power equipment are supported and against which the translational/rotational members are driven to propel outdoor power equipment 500 along the surface. Generally, ground is also the surface from which the vegetation grows. Thus, the height-of-cut 521 parameter is also a distance above ground of cut vegetation, which has been cut by outdoor power equipment 500.

Mechanical parameters of outdoor power equipment 500 can also include a behind center distance (BCD) 522. BCD 522 according to one suitable definition is a distance between a bedknife tip of outdoor power equipment 500 and a bottom dead center position (e.g., a 6 o'clock position for a clock face in the plane of the page of FIG. 5) of the cutting reel of outdoor power equipment 500 when viewed from the cutting reel end. As an example, the tip of the bedknife should be located behind the 6 o'clock position (towards the rear roller of outdoor power equipment 500) to achieve a good quality of cut. Distances further behind the tip of the bedknife from the 6 o'clock position (e.g., larger values of BCD 521) will tend to yield a more aggressive cut for outdoor power equipment 500. Aggressiveness can be important for low heights of cut 521 as scalping of vegetation can occur for soft turf if an aggressive BCD 521 is selected (e.g., a larger value of BCD).

Also illustrated is a bedknife attitude angle 523, which can also be referred to as a steepness of the bedknife. A steep bedknife translates to more ground clearance between the bedknife underside and the turf surface, and likewise a decreased likelihood that the bedknife will drag on the turf during cutting. However, a steeper attack angle setting also translates to a greater BCD and so this should be taken into account during geometric setup of mechanical parameters of outdoor power equipment 500.

A further mechanical parameter includes a type of bedknife 524. Different bedknives 524 can have different numbers of blades, different cutting reel speeds, and can affect other mechanical parameters. Where a bedknife involves a different reel motor, a type of counterbalance (not depicted) that properly balances the selected reel motor can also be an adjustable parameter of outdoor power equipment 500. An improperly balanced cutting unit can result in unequal height-of-cut 521, particularly for soft or puffy turf (e.g., ground) or low height-of-cut 521. The proper counterbalance can be selected to mitigate or avoid improper balance of outdoor power equipment 500.

Bedblock eccentricity 525 is a further mechanical parameter of outdoor power equipment 500. Bedblock eccentricity 525 can be set by a rotational setting of the depicted bedblock eccentricity control mechanism 525A illustrated by FIG. 5. Bedblock eccentricity control mechanism 525A can comprise a rotational mechanism set by clock face position, rotational angle (e.g., in degrees, minutes, etc.), or the like. In the example depicted for outdoor power equipment 500, bedblock eccentricity control mechanism 525A is set at about a 1:30 clock face position. In one or more embodiments, a setting of the bedblock eccentricity 525 mechanical parameter can adjust bedknife attitude angle 523.

Rear roller position 526 is an additional mechanical parameter of outdoor power equipment 500. Rear roller position 526 can be adjusted by moving a fastener 526A within an adjustment slot 526B, according to a marker within a mechanical rear roller position 526 display window. In the embodiment depicted by FIG. 5, the marker is embodied as a colored circle (e.g., yellow) and the mechanical display window is a hole or slot within a frame of outdoor power equipment 500 through which different portions of the colored circle can be viewed as the fastener 526A is moved within the adjustment slot 526B. The depicted position is referred to as a half-color position (or "half-yellow" position for a yellow colored circle).

For low height-of-cut 521 the cutting reel of outdoor power equipment 500 should be maintained at a very high degree of parallelism to achieve a high quality of cut. When rear roller position 526 is moved between color positions parallelism is re-checked to maintain the high degree of parallelism. Loss of parallelism of the cutting reel can result in uneven cut, such as shading, creasing, scalping or a combination of the foregoing problems. In an embodiment, equipment calibration applications disclosed herein can remind a user (e.g., through an output on a graphical display, playback of an audio alarm tone, initiation of a tactile response function (e.g., vibration, buzzing, etc.), or the like or a combination thereof) to recheck parallelism of the cutting reel.

It should be appreciated that embodiments of the subject disclosure envision other outdoor power equipment 500 than the example provided by FIG. 5. Consequently, outdoor power equipment 500 is provided as an illustrational example but not for limiting the scope of the present disclosure.

The above diagrams have been described with respect to interaction between several components of an apparatus or machine, a computing device, a control device, a communication network, an application, a server device, an electronic memory device, a storage device, or the like. It should be appreciated that in some suitable alternative aspects of the present disclosure, such diagrams can include the depicted machines, devices, networks, applications, etc., specified therein, some specified machines/devices/networks/applications or additional machines/devices/networks/applications. It should also be appreciated that machines/devices/networks/applications depicted in one Figure can be interchanged with those in other Figures consistent with the functionality of the specified machines/devices/networks/applications or in conjunction with such modifications thereto that would be evident to one of ordinary skill in the art, or made evident to one of ordinary skill in the art through their knowledge and experience coupled with the teachings of the present disclosure. For example, it should be understood that equipment calibration application 200 of FIG. 2 could be substituted for equipment calibration application 104 of FIG. 1, or some or all of its functionality and features aggregated with equipment calibration application 104, or vice versa. Likewise, communication framework 112 could be embodied by equipment calibration environment 300 in some embodiments, or like wired or wireless communication interfaces, or suitable combinations of the foregoing in still other embodiments.

Generally, the illustrated embodiments are not provided as strict limitations on how the disclosed aspects can be practiced by one of ordinary skill in the art, but are intended to be provided as examples that can be modified, interchanged, added to or subtracted from as would be suitable to one of ordinary skill in the art. As a further example, components of disclosed devices can be implemented as connected to other components rather than included within the parent device. For instance, storage 406 can be external to mobile device 400 in one embodiment. Alternatively, the opposite orientation can be implemented within the scope of the disclosure: one component (e.g., storage 406) depicted separate from another component (e.g., memory(ies) 434) can be aggregated as a single component in some embodiments. Additionally, it is noted that one or more disclosed processes can be combined into a single process providing aggregate functionality. Still further, components of disclosed machines/devices/networks/applications can also interact with one or more other components not specifically described herein but known by those of skill in the art.

In view of the exemplary diagrams described herein, process methods that can be implemented in accordance with the disclosed subject matter will be better appreciated with reference to the flowcharts of FIGS. 6-9. While for purposes of simplicity of explanation the methods of FIGS. 6-9 are shown and described as a series of blocks, it is to be understood and appreciated that the scope of the disclosure and the claimed subject matter is not limited by the order of the blocks, as some blocks can occur in different orders or concurrently with other blocks from what is depicted and described herein. Moreover, not all illustrated blocks are necessarily required to implement the methods described herein. Additionally, it should be further appreciated that some or all of the methods disclosed throughout this specification are capable of being stored on an article of manufacture to facilitate transporting and transferring such methods to an electronic device. The term article of manufacture, where utilized, is intended to encompass a computer program accessible from any computer-readable device, device in conjunction with a carrier, or storage medium.

Figure 6:
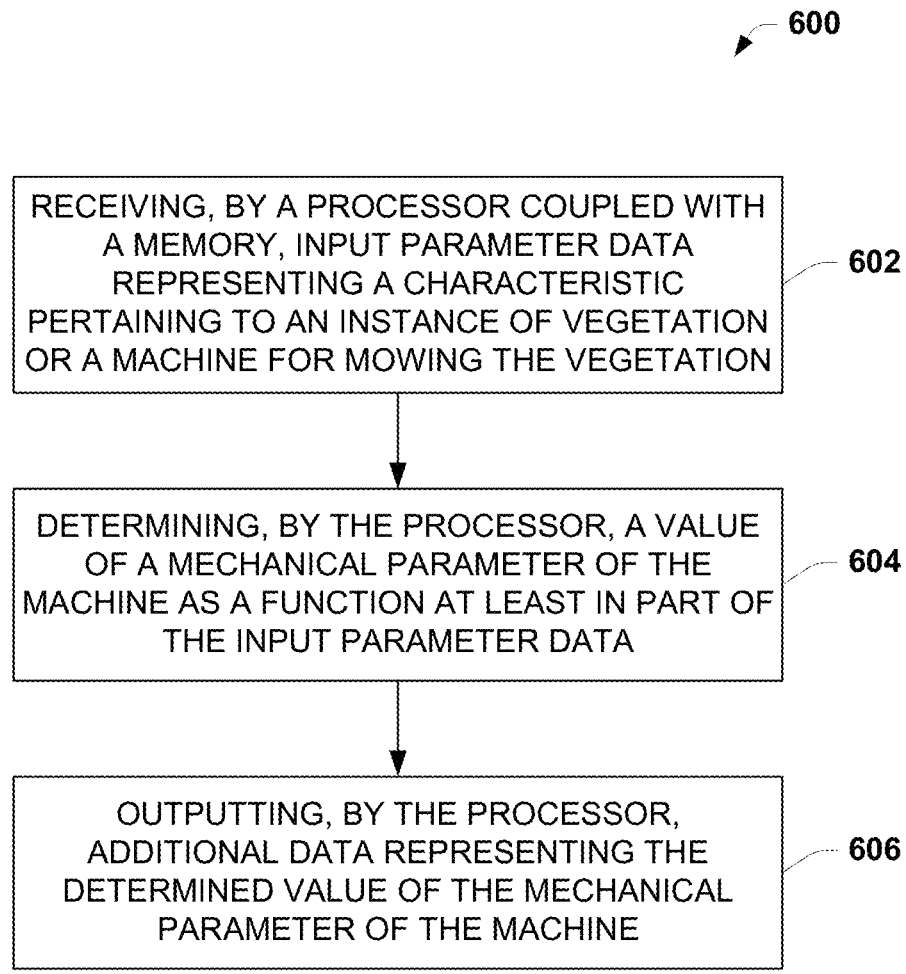
FIG. 6 illustrates a flowchart of an example method for generating adjustment data for improving cut performance of outdoor power equipment, in additional embodiments.

Referring now to FIG. 6, there is depicted a flowchart of a sample method 600 for practicing various embodiments of the present disclosure. In one or more embodiments, method 600 (and other methods disclosed herein) can be implemented by a suitable computing device, electronic control device, one or more applications executing on such device, either alone or in combination with one or more other processor, server or memory devices interconnected by a communication network(s), or the like. For instance, the disclosed method(s) can be executed at least in part by a processor coupled with a memory that stores process instructions suitable to carry out steps or operations defined by method 600 (or other disclosed methods), although the subject disclosure is not limited to this example structure.

At 602, method 600 can comprise receiving input parameter data representing a characteristic pertaining to an instance of vegetation or a machine for mowing the vegetation. The input parameter data can be qualitative or quantitative in nature, or a suitable combination of the foregoing, in various embodiments. In some embodiments, for example, the input parameter can be a value of a fixed mechanical parameter of the machine, a value of a target quality of cut metric for the machine, a value of a performance metric of the machine, or the like, or a suitable combination. In other examples, the input parameter can be environment data affecting the vegetation, the machine, or operation of the machine on the vegetation. In yet another example, the input parameter can be information particular to the vegetation, such as a type of grass included in the vegetation, a load parameter that the vegetation has on the machine, and so forth. Other suitable input parameter data disclosed herein, known in the art or made known to one of skill in the art by way of the teachings disclosed herein are considered within the scope of the disclosure.

At 604, method 600 can comprise determining a value of a mechanical parameter of the machine as a function at least in part of the input parameter data. The mechanical parameter can be an adjustable mechanical characteristic of the machine, in some embodiments. In one embodiment(s), the adjustable mechanical characteristic can be automatically adjustable by a control device of the machine. In other embodiments, the adjustable mechanical characteristic can be manually adjustable by a user of the machine.

In some disclosed embodiments, the determined value of the mechanical parameter, as well as the input parameter(s) can be embodied in a database, a spreadsheet, or the like. An example of such a spreadsheet provides a two dimensional matrix of values of the mechanical parameter, as a function of two (or more) dynamic input parameters and two (or more) static (e.g., fixed) input parameters. The mechanical parameter can be embodied by frequency-of-clip values in individual cells of the matrix, according to this example. Preferred ranges of the frequency-of-clip can be specified with parametric weights to increase allocation of frequency-of-clip values within the preferred ranges, in some embodiments. The dynamic input parameters are forward speed (along a horizontal axis of the matrix) and reel rotational speed (along a vertical axis of the matrix) according to this example. Fixed input parameters can be: number of blades on a cutting reel (e.g., 14 blades as one example among a finite set of blades) and height-of-cut (e.g., 3 millimeters (mm), or other suitable value depending on implementation). In response to receiving input parameter data at reference number 602 (e.g., the 14 cutting blade number, the 3 mm height-of-cut, a forward speed value and a reel rotational speed value), method 600 can determine a value of the mechanical parameter (e.g., frequency-of-clip) from the spreadsheet. A value within the preferred (shaded) region of the matrix can optionally be determined where permitted by the input parameters.

In another embodiment, method 600 can output values of forward speed and reel rotational speed as determined mechanical parameters, for the given number of blades, height of cut and a given frequency of clip value. In such embodiment, a value of forward speed or reel rotational speed within the preferred (shaded) region of the matrix is selected, where permitted by the frequency-of-clip value.

At 606, method 600 can comprise outputting additional data representing the determined value of the mechanical parameter of the machine. The recommended value can be output on a graphical display of an electronic device in an embodiment (e.g., a smart phone, mobile computing device, laptop computer, computer, tablet computer, and so forth; see also FIG. 2, supra). In some embodiments, the output can be provided with a request to automatically configure a machine according to the determined value of the mechanical parameter (e.g., by an electronic connection with an electronic control device of the machine). In response to approval of the request at a user input interface of the electronic device, the determined value can be saved to a data field of the electronic control device of the machine that corresponds to the mechanical parameter, facilitating automatic adjustment of the mechanical parameter by the electronic control device consistent with the determined value. In other embodiments, the output can be provided at the graphical display in conjunction with an instruction to manually adjust the mechanical parameter of the machine according to the determined value. An input request can await further user input at the user input interface confirming that the manual adjustment has been completed.

Figure 7:
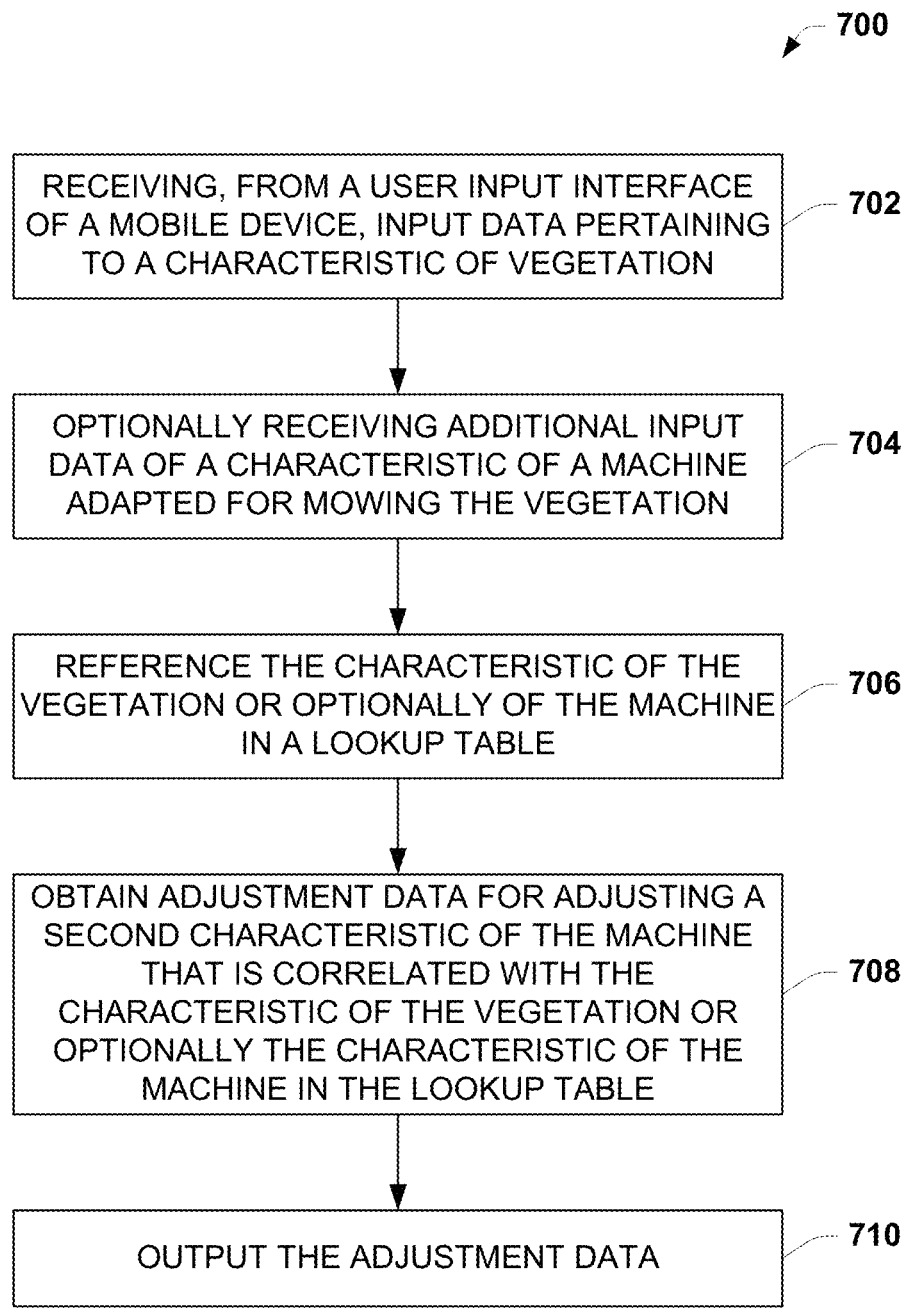
FIG. 7 depicts a flowchart of a sample method for generating adjustment data for improving cut performance of outdoor power equipment in further embodiments.

Referring now to FIG. 7, there is illustrated a flowchart of an example method 700 according to alternative or additional embodiments of the present disclosure. At 702, method 700 can comprise receiving, from a user input interface of a mobile device, input data pertaining to a characteristic of vegetation. The characteristic can comprise information pertaining to a type of the vegetation (e.g., a type of grass), environment characteristics affecting the vegetation (e.g., turf moisture, wetness of the vegetation, atmospheric moisture, and so forth) or like characteristics disclosed herein or known in the art, or a suitable combination of the foregoing. At 704, method 700 can comprise optionally receiving additional input data of a characteristic of a machine adapted for mowing the vegetation. Such characteristics can include a number of blades on a cutting reel, a height of cut, a drive speed, a cutting reel rotation speed, a type or identifier of the cutting reel, a parallelism metric of the machine, a rear roller position of the machine, a bedknife eccentricity metric of the machine, a bedknife eccentricity angle of the machine, a behind center distance (BCD) metric of the machine, or other characteristic of the machine disclosed herein, known in the art or made known to one of ordinary skill in the art by way of the teachings provided herein.

Further to the above, method 700, at 706, can comprise referencing the characteristic of vegetation or optionally the characteristic of the machine in a lookup table. At 708, method 700 can comprise obtaining adjustment data for adjusting a second characteristic of the machine that is correlated with the characteristic of the vegetation or optionally the characteristic of the machine in the lookup table. Moreover, at 710, method 700 can comprise outputting the adjustment data.

Figure 8:
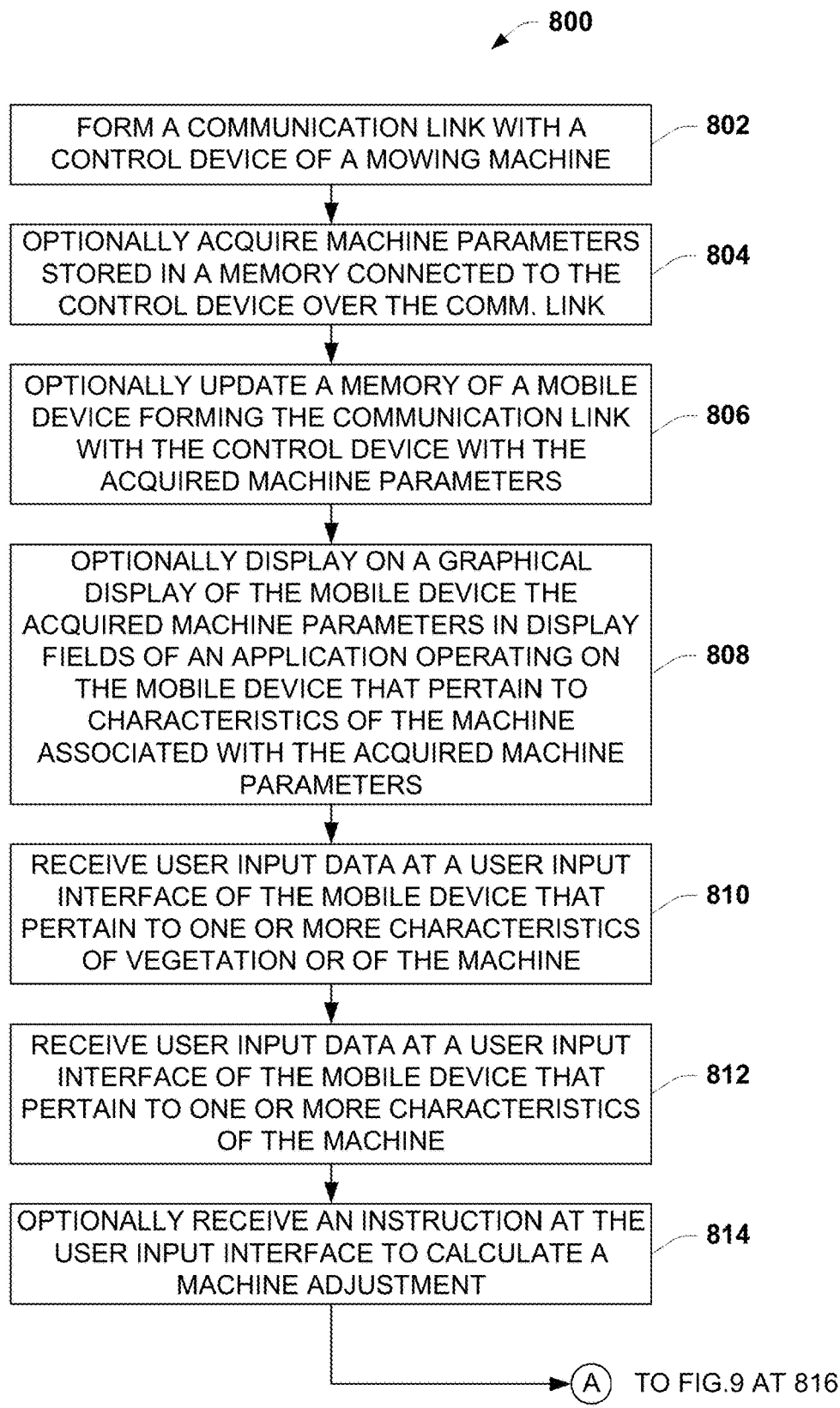
FIGS. 8 and 9 illustrate a flowchart of a sample method for improving quality performance of outdoor power equipment, in still additional embodiments.
Figure 9:
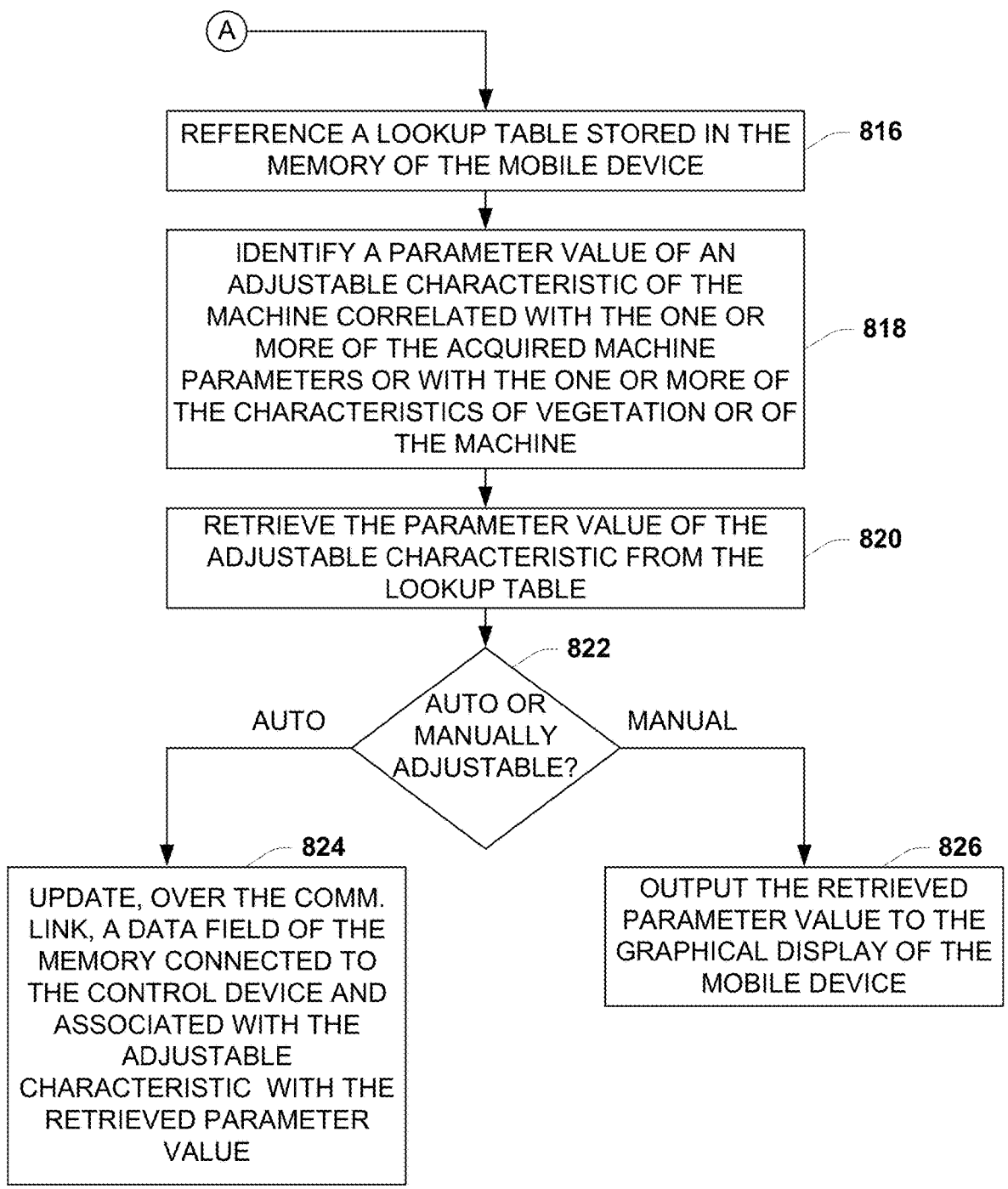

FIGS. 8 and 9 illustrate a flowchart of an example method 800 according to still further embodiments of the present disclosure. At 802, method 800 can comprise forming a communication link with a control device of a mowing machine. At 804, method 800 can comprise optionally acquiring values of mechanical parameters of the machine stored in a memory connected to the control device over the communication link. Further, at 806, method 800 can comprise optionally updating a memory of a mobile device forming the communication link with the control device with the acquired machine parameters. At 808, method 800 can further comprise optionally displaying on a graphical display of the mobile device the acquired machine parameters in display fields of the application operating on the mobile device that pertain to characteristics of the machine associated with the acquired machine parameters.

Still referring to FIG. 8, at 810, method 800 can comprise receiving user input data at a user input interface of the mobile device that pertain to one or more characteristics of vegetation. At 812, method 800 can further comprise receiving user input data at the user input interface of the mobile device that pertain to one or more characteristics of the machine. Moreover, at 814, method 800 can comprise optionally receiving an instruction at the user input interface to calculate a machine adjustment for calibration or optimization of the machine.

Referring now to FIG. 9, method 800 continues at 816, where the method can comprise referencing a lookup table stored in the memory of the mobile device. At 818, method 800 can comprise identifying a parameter value of an adjustable characteristic of the machine correlated with the one or more of the acquired machine parameters or with the one or more characteristics of the vegetation, or with the one or more characteristics of the machine. At 820, method 800 can comprise retrieving the parameter value of the adjustable characteristic from the lookup table.

At 822, a decision is made as to whether the adjustable characteristic of the machine is auto adjustable, or manually adjustable. If auto adjustable, method 800 can proceed to 824. Otherwise, method 800 proceeds to 826. At 824, method 800 can comprise updating, over the communication link, a data field of the memory connected to the electronic control device of the machine and associated with the adjustable characteristic of the machine with the retrieved parameter value. Method 800 can then end. At 826, method 800 can comprise outputting the retrieved parameter value to the graphical display of the mobile device. Method 800 can end after reference number 826, or optionally after user acknowledgment of the output of the retrieved parameter at the graphical display (not depicted).

Appendix A is hereby incorporated by reference in the present disclosure in its entirety and for all purposes.

What has been described above includes examples of the subject innovation. It is, of course, not possible to describe every conceivable combination of devices, components thereof or method steps for purposes of describing the subject disclosure, but one of ordinary skill in the art can recognize that many further combinations, additions, subtractions and permutations are possible. Accordingly, the disclosed subject matter is intended to embrace all such alterations, modifications and variations that fall within the spirt and scope of the disclosure. To the extent that the term "includes", "including", "has" or "having" and variants thereof is used in either the detailed description or the claims, such term is intended to be inclusive in a manner similar to the term "comprising" as "comprising" is interpreted when employed as a transitional word in a claim.

The word "exemplary" where used herein is intended to mean serving as an example, instance or illustration. Any aspect or design described herein as "exemplary" is not necessarily to be construed as preferred or advantageous over other aspects or designs. Rather, use of the word "exemplary" is intended to present concepts in a concrete fashion. As used in this application, the term "or" is intended to mean an inclusive "or" rather than an exclusive "or". Accordingly, unless specified otherwise or clear from context, "X employs A or B" is intended to mean any of the natural inclusive permutations of A or B. That is, if X employs A, X employs B; or X employs both A and B, then "X employs A or B" is satisfied. In addition, the articles "a" and "an" as used in this application and the appended claims should generally be construed to mean "one or more" unless specified otherwise or clear from context to be directed to a singular form.

What is claimed is:

1. A mobile device, comprising:
a processor for executing instructions to perform operations of the mobile device;
a communication interface for communicatively coupling the processor to a processing device external to the mobile device; and
a memory for maintaining the instructions executed by the processor, the operations comprising:
receiving, by the processor, input parameter data representing a characteristic pertaining to an instance of vegetation or a machine for mowing the vegetation;
determining, by the processor, a value of a mechanical parameter of the machine as a function at least in part of the input parameter data, the mechanical parameter of the machine comprising: a cutting reel cassette identifier of a set of cutting reel cassette identifiers, a rear roller position, a bedblock eccentricity position, a number of blades on a bedknife, a bedknife attitude angle, a behind center distance (BCD) of bedknife, a reel motor counterbalance of a set of reel motor counterbalances, a parallelism metric of the bedknife, a drive speed, a cutting reel speed, a frequency of clip metric in units of distance, or a type of bedknife of a set of bedknives; and
outputting, by the processor, additional data representing the determined value of the mechanical parameter of the machine, the outputting further comprising:
establishing, by way of the communication interface, a communication link with an electronic control device of the machine; and
updating, by the communication link, a data field of the electronic control device with the additional data representing the determined value of the mechanical parameter of the machine; wherein the electronic control device is operable to adjust the mechanical parameter of the machine, or adjust a second parameter of the machine dependent upon the mechanical parameter of the machine, consistent with the determined value of the mechanical parameter of the machine.

2. The mobile device of claim 1, wherein at least one of the following:
the communication interface is a wireless communication interface operatively coupled to the processor, wherein the communication link is a wireless communication link between the wireless communication interface and the electronic control device of the machine; or
the communication interface is a wired communication interface operatively coupled to the processor, wherein the communication link is a wired communication link between the wired communication interface and the electronic control device of the machine.

3. The mobile device of claim 1, further comprising a graphical display unit, wherein the outputting the additional data representing the value of the determined mechanical parameter of the machine further comprises displaying the additional data on the graphical display unit in response to determining the mechanical parameter of the machine.

4. The mobile device of claim 1, wherein the characteristic pertains to the instance of vegetation and includes a type of grass associated with the vegetation or a moisture content associated with the vegetation.

5. The mobile device of claim 1, wherein the characteristic pertains to the machine for mowing the vegetation and includes a number of cutting blades on a cutting reel of the machine, a target height of cut of the machine, or a drive speed of the machine.

6. The mobile device of claim 1, wherein the determined value of the mechanical parameter of the machine is a first member selected from the group consisting of: a first value of the frequency of clip metric in units of distance and a second value of the cutting reel speed.

7. The mobile device of claim 6, wherein the additional data provides both the determined value and provides a second member selected from the group consisting of: the first value of the frequency of clip and the second value of the cutting reel speed, wherein the second member selected from the group is different from the first member selected from the group.

8. The mobile device of claim 1, wherein the determined value of the mechanical parameter of the machine is selected from a group consisting of: a first value of the frequency of clip metric in units of distance of the machine, a second value of the cutting reel speed of the machine, a third value of the rear roller position of the machine, a fourth value of the bedknife attitude angle of the machine and a fifth value of the cutting reel cassette identifier of the set of cutting reel cassette identifiers.

9. The mobile device of claim 8, wherein the operations further comprise determining, by the processor, a second value of a second mechanical parameter of the machine selected from the group, wherein the second mechanical parameter pertains to the means for mowing the vegetation.

10. The mobile device of claim 1, further comprising a lookup table stored in the memory, the lookup table associating mechanical parameter values to values of two or more of the characteristics pertaining to the instance of vegetation or the machine, wherein determining the value of the mechanical parameter at least in part comprises reading the lookup table and acquiring mechanical parameter information associated by the lookup table with values of the two or more characteristics indicated by the input parameter data.

11. A method of generating adjustment data for a machine for mowing vegetation, the method executed utilizing a processor and memory of a mobile device comprising the processor, the memory and a communication interface for communicatively coupling the processor to a control module of the machine by way of a communication interface of the control module, comprising:
receiving, by the processor coupled with the memory, input parameter data representing a characteristic pertaining to an instance of vegetation or pertaining to the machine for mowing the vegetation;
determining, by the processor, a value of a mechanical parameter of the machine as a function at least in part of the input parameter data, wherein the mechanical parameter pertains to: a cutting reel cassette identifier of a set of cutting reel cassette identifiers, a rear roller position, a bedblock eccentricity position, a number of blades on a bedknife, a bedknife attitude angle, a behind center distance (BCD) of bedknife, a reel motor counterbalance of a set of reel motor counterbalances, a parallelism metric of the bedknife, a drive speed, a cutting reel speed, a frequency of clip metric in units of distance, or a type of bedknife of a set of bedknives; and outputting, by the processor, additional data representing the determined value of the mechanical parameter of the machine by transferring the determined value of the mechanical parameter of the machine over a communication link to a control device of the machine for mowing the vegetation, and updating a data field in a memory associated with the mechanical parameter of the machine with the determined value, the data field utilized by a control device of the machine for adjusting the machine according to the determined value.

12. The method of claim 11, wherein receiving the input parameter data further comprises receiving the input parameter data at least in part by way of a user input interface of a mobile device.

13. The method of claim 11, wherein receiving the input parameter data further comprises receiving the input parameter data at least in part by way of a communication link with a control device of the machine for mowing the vegetation.

14. The method of claim 11, wherein determining the value of the mechanical parameter further comprises referencing the input parameter data in a look-up table that correlates the input parameter data with the value of the mechanical parameter of the machine.

15. The method of claim 14, wherein receiving the input parameter data further comprises:

receiving input parameter data representing a first characteristic pertaining to the instance of vegetation and representing a second characteristic pertaining to the machine for mowing the vegetation; and determining the value of the mechanical parameter further comprises referencing the first characteristic and the second characteristic in the look-up table and identifying the value of the mechanical parameter correlated by the look-up table to the first characteristic and to the second characteristic.

16. The method of claim 11, wherein outputting the additional data further comprises displaying the determined value of the mechanical parameter on a graphical display unit of the mobile.

17. The method of claim 16, wherein displaying the determined value of the mechanical parameter on the graphical display unit of the mobile device facilitates manual adjustment of the mechanical parameter according to the determined value.

* * * * *